(12) United States Patent
Lee

(10) Patent No.: US 10,515,766 B2
(45) Date of Patent: Dec. 24, 2019

(54) CAPACITOR WITH NEGATIVE CAPACITANCE

(71) Applicant: Choon Sae Lee, Dallas, TX (US)

(72) Inventor: Choon Sae Lee, Dallas, TX (US)

(*) Notice: Subject to any disclaimer, the term of this patent is extended or adjusted under 35 U.S.C. 154(b) by 649 days.

(21) Appl. No.: 15/091,755

(22) Filed: Apr. 6, 2016

(65) Prior Publication Data

US 2016/0301230 A1   Oct. 13, 2016

Related U.S. Application Data

(60) Provisional application No. 62/144,914, filed on Apr. 8, 2015.

(51) Int. Cl.
| | |
|---|---|
| *H01G 4/40* | (2006.01) |
| *H01G 7/00* | (2006.01) |
| *H02J 50/05* | (2016.01) |
| *H01G 4/255* | (2006.01) |
| *H01G 5/16* | (2006.01) |
| *H01G 4/005* | (2006.01) |

(52) U.S. Cl.
CPC ............. *H01G 4/40* (2013.01); *H01G 7/00* (2013.01); *H01G 4/005* (2013.01); *H01G 4/255* (2013.01); *H01G 5/16* (2013.01); *H02J 50/05* (2016.02)

(58) Field of Classification Search
USPC ........................................................ 320/108
See application file for complete search history.

(56) References Cited

U.S. PATENT DOCUMENTS 7,106,063 B1 * 9/2006 Zens ................ G01R 33/34069
324/318

* cited by examiner

*Primary Examiner* — Eric D Lee
(74) *Attorney, Agent, or Firm* — Jack D. Stone, Jr.; Scheef & Stone, L.L.P.

(57) ABSTRACT

A capacitor includes a first plate and a second plate parallel to the first plate. An RF source includes a first line and a second line through which RF is fed. The first line is electrically connected to the first plate. The second line is passed through the first and second plates and then looped around the first and second plates, and the pass and loop of the second line is repeated at least once. The second line is then passed through the first plate and electrically connected to the second plate to form a capacitor having negative capacitance.

10 Claims, 2 Drawing Sheets

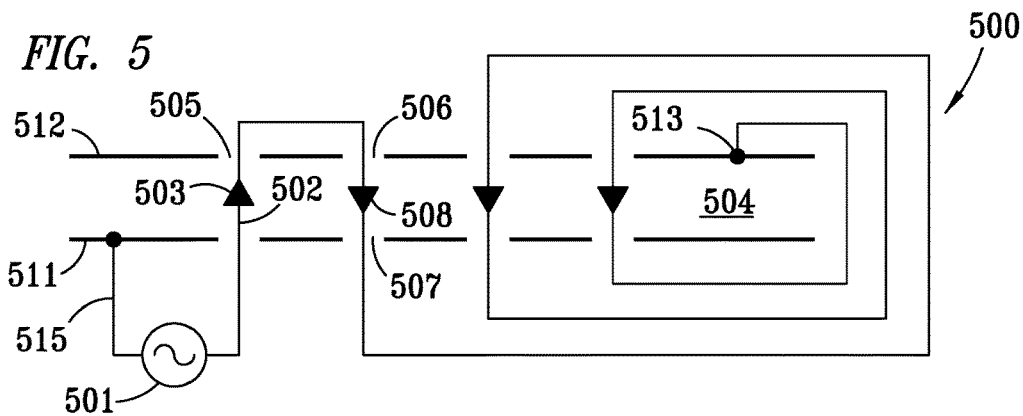
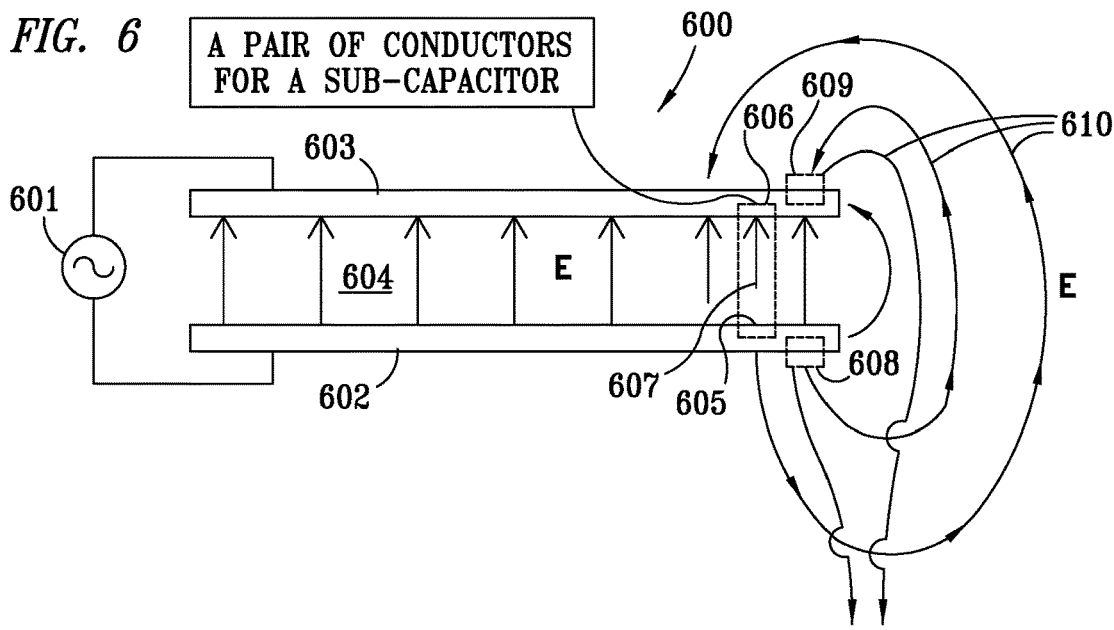
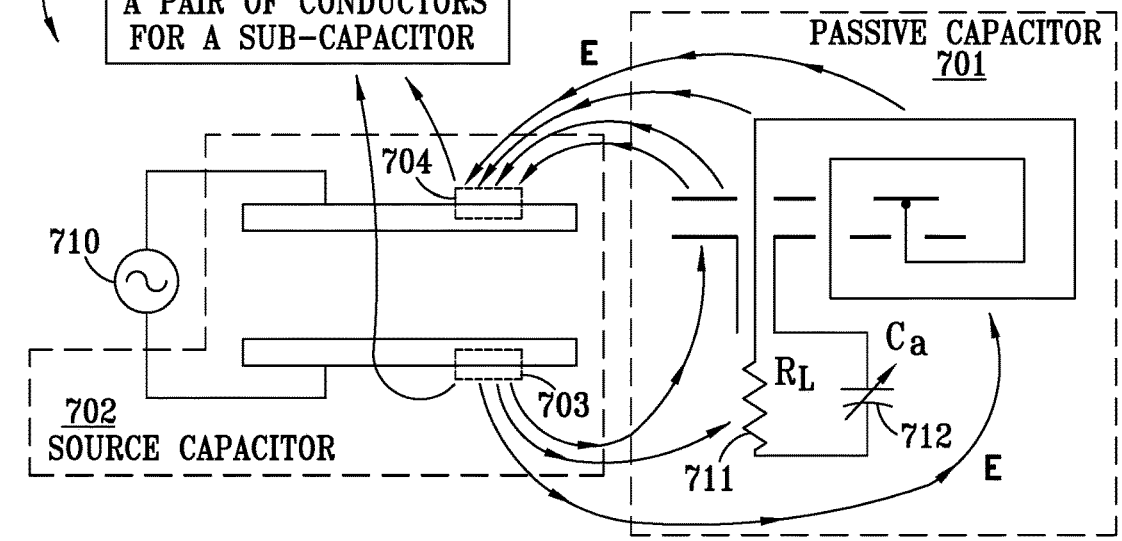

CAPACITOR WITH NEGATIVE CAPACITANCE

CROSS-REFERENCE TO RELATED APPLICATIONS

This application claims the benefit of U.S. Provisional Application No. 62/144,914, filed Apr. 8, 2015, which application, including respective appendices, is hereby incorporated herein by reference, in its entirety.

TECHNICAL FIELD

The invention relates generally to electrical circuit elements and, more particularly, to an electrical circuit element having negative capacitance.

BACKGROUND

A capacitor comprises two insulated conductors, and the capacitance is characterized by the field distribution in the two-body system. If charge Q is placed on one conductor and −Q on the other conductor, the potential difference between the two conducting bodies is proportional to Q and the proportional constant is 1/C where C is called capacitance.

The charge distribution produces an electric field, which in turn causes a potential difference V. The electric field is also affected by the material between the two conductors. When an external field is applied to a dielectric material, the molecules/atoms of the dielectric are polarized to become dipole moments which will produce a net electric field in the opposite direction to the external field, resulting in decreased potential difference. Consequently, the capacitance increases in the presence of dielectric material. The reduction of the electric field due to the presence of dielectric material is characterized by a dielectric constant $\varepsilon_r$ (or relative permittivity), such that the resultant net electric field becomes $1/\varepsilon_r$ of the external electric field.

SUMMARY

Normally, a dielectric constant is always larger than 1 (1 being free-space dielectric constant) because of the induced dipole moments within the dielectric. This invention introduces a novel device where an AC electric field is enhanced (i.e., the additional field is in the same direction as the external field) and the effective dielectric constant becomes less than 1, even less than zero, that is, a negative value. When the effective dielectric constant becomes negative, the capacitance also becomes negative. Both an inductor and a capacitor of negative capacitance provide positive reactance. However an advantage of a negative-capacitance capacitor is that it will be physically much smaller than an inductor having an equivalent positive (inductive) reactance.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 is a schematic view exemplifying a capacitor exhibiting capacitance larger than capacitors that do not incorporate extra features embodying principles of the present invention; and FIGS. 6-7 exemplify applications of capacitors having negative capacitance.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. Additionally, as used herein, the term "substantially" is to be construed as a term of approximation.

Figure 1:
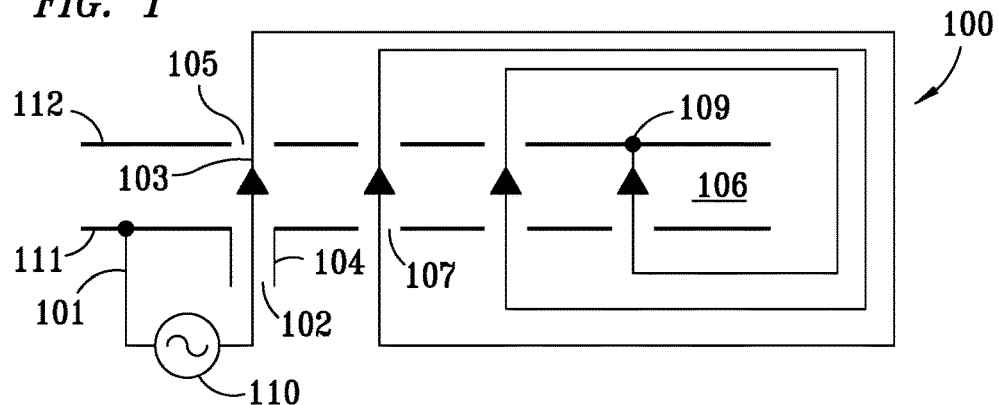
FIGS. 1-4 are schematic views exemplifying capacitors exhibiting capacitance that is smaller than conventional capacitors that do not incorporate features such as negative capacitance in accordance with principles of the present invention.

The shape of the negative-capacitance capacitor is similar to those of other ordinary capacitors as exemplified in FIG. 1. The difference between a conventional capacitor and a capacitor having negative capacitance in accordance with principles of the present invention lies in the radio frequency ("RF") feeding. As shown in FIG. 1, a capacitor designated by the reference numeral 100 embodying features of the present invention, comprises a ground line 101 from a radio frequency ("RF") source 110 connected to a bottom ground plate 111, and a line 103 from the center feeding pin 102 of a coaxial feed 104 that is connected to the RF source 110 passes through a small hole 105 in the top patch 112 and this line 103 feeds the capacitor cavity 106 again through a hole 107 at the bottom ground plate, thus having the current sources in the space between the plates point in the same direction. Note that at a low frequency, these current sources produce larger fields by constructive interference, assuming the inductive effect is negligible at such low frequency. There can be a number of current sources in the capacitor cavity 106 to increase the field strength by repeating the above process of line 103 looping around the plates 111 and 112 inside the plates in one direction and outside the plates in the other direction. The end of the line 103 is connected to the top patch 112 at 109, thus making the device a capacitor. In the present case, the current line 103 before being connected to the top patch 112 provides a field similar to the external field in a conventional capacitor. The other feeding elements act as additional field sources to produce extra fields beyond the external field similar to polarization (dipole moment density) in a dielectric medium. In an insulator, the induced dipoles produce an opposing field to the external field, thus making the electric susceptibility $\chi_e$ positive where the dielectric constant $\varepsilon_r=1+\chi_e$. Now in the present invention, since the additional field points in the same direction as the effective external field, the equivalent electric susceptibility becomes negative. When there is sufficient current flowing in the same direction with the original current element to have a negative effective electric susceptibility with a magnitude larger than 1, then the effective dielectric constant becomes negative. Under this circumstance, the capacitance of the two-parallel plate capacitor becomes negative as well.

Figure 2:
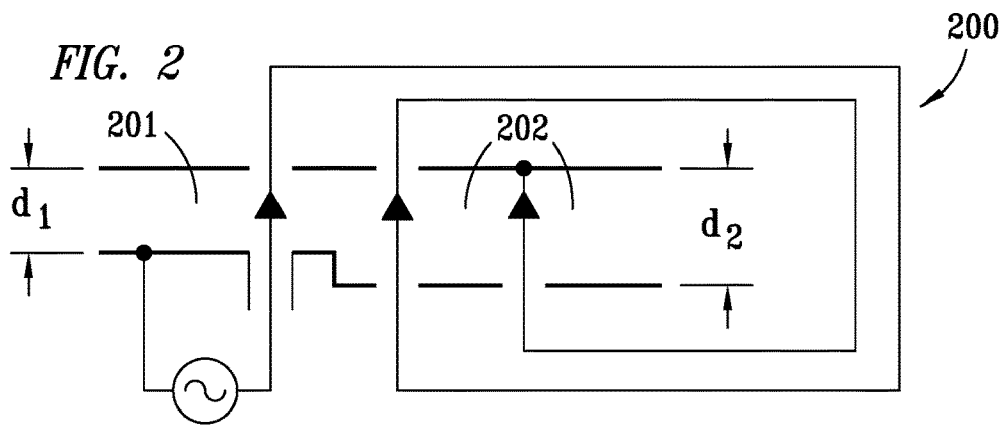
Figure 3:
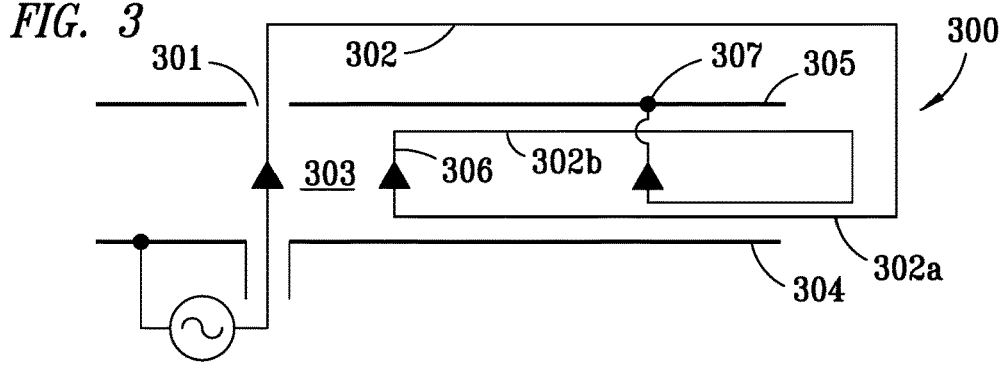
Figure 4:
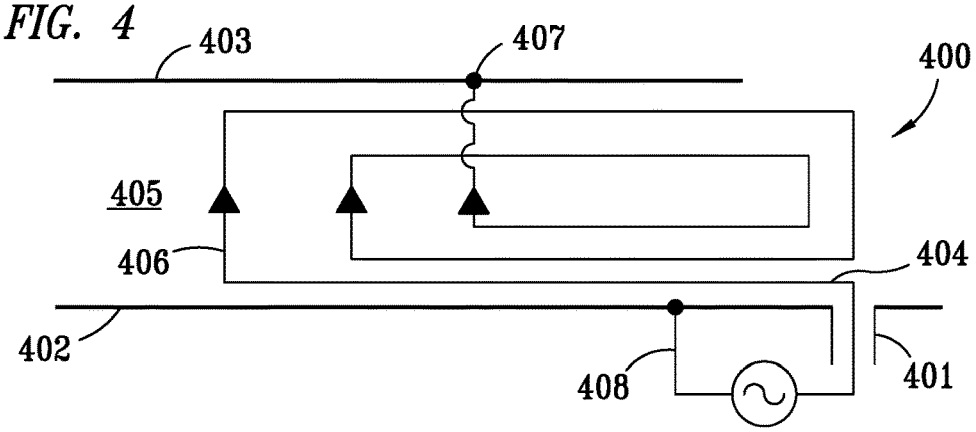

FIGS. 2-4 exemplify in capacitors 200, 300, and 400 a few of many alternate embodiments of the invention that yield various dielectric constants that are less than 1. The number of current elements in the capacitor cavity can be adjusted to vary the effective susceptibility and dielectric constant. It is also possible to control the effect of the current source by changing the separation distance d1 or d2 of the two plates at the source point (201 or 202) as shown in FIG. 2.

For fabrication convenience, we can also consider making the device with fewer holes or even no holes in the conducting plates (FIGS. 3 and 4). In FIG. 3, for example, there is only one hole 301 through which a feed line 302 passes. The feed line 302*a* enters the capacitor cavity 303 again near bottom plate 304 and bends sharply to produce a vertical current element 306, after which the feed line 302*b* travels along the top plate 305 and exits the capacitor cavity 303. This process may continue to put as many vertical current elements (such as 306) as needed. At the end, the feed line 302 is connected to the top patch 305 at 307.

In FIG. 4, there are no holes in the capacitor plates 402 and 403. The RF source 401 is located outside the capacitor where the ground 408 of the RF source 409 is connected to the bottom plate 402. The feed line 404 enters the capacitor cavity 405 near the bottom plate 402 and makes a sharp turn within the capacitor cavity to have a vertical current source 406, after which the feed line makes another sharp turn near the top patch 403 and travels along the top patch 403 before exiting the capacitor cavity 405. This process may continue to put as many vertical current elements (such as 406) as needed within the capacitor cavity 405. The feed line is eventually connected to the top patch 403 at 407.

FIG. 5 exemplifies in a capacitor 500 how, by changing the direction of the each vertical current element, it is possible to have a variable susceptibility that is positive, resulting in a large dielectric constant. The feed line 502 from the RF source 501 produces an upward vertical current source 503 within the capacitor cavity 504, and comes out of the capacitor cavity through a hole 505 located at the upper plate 512. The ground line 515 of the RF source 501 is connected to the bottom plate 511 of the capacitor 500. The feed line 502 enters the capacitor cavity 504 again through a hole 506 at the upper plate 512 and produces a downward current source 508 within the capacitor cavity 504 before coming out of the capacitor cavity through a hole 507 at the bottom plate 511. The feed line 502 goes around the capacitor 500 and enters again through a hole at the top plate to produce a downward current source within the cavity. This process may continue to produce as many downward current sources as needed before the feed line 502 is connected to a point 513 at the upper plate 512 at the end. In some applications, a very large dielectric constant is desirable and such a device can be produced artificially using the technique in this invention.

Wireless Charger Application:

In FIG. 6, an RF source 601 is connected to a capacitor 600 that comprises an upper conducting plate 603, a bottom conducting plate 602, and capacitor space 604 between the two conductors 602 and 603 that is filled with insulating dielectric material(s) (not shown). Such a capacitor source is usually available in most areas having electric power provided at an electric outlet. For example, the RF source 601 can be a source for conventional alternating current ("AC") that provides electric power to households. The capacitor 600 may be modeled as comprising many small sub-capacitors, each of which has a pair of small conducting surface patches on the two conductors that are connected by electric field lines. Here the capacitance of the capacitor is the sum of all capacitances of the sub-capacitors. Each sub-capacitor consists of a small patch of conducting surface at the bottom plate 602 and that at the upper plate 603 that are connected by electric field lines. For example, in FIG. 6, a small conducting surface 605 at the bottom plate 602 is connected to another small conducting surface 606 at the upper plate 603 by electric line 607. Those two conducting patches and the insulating space between those two conducting patches filled with electric field lines behave as a sub-capacitor among other many sub-capacitors. Another example of a sub-capacitor is a pair of conducting surfaces of 608 and 609 at the lower and upper conductors of 602 and 603, respectively. These two conducting patches are connected by electric field lines 610 that are outside of the capacitor space 604, which may be used as a source capacitor for wireless power collection.

When an object, especially conducting metal, approaches near a source capacitor, the field lines are distorted, and consequently the capacitance of the source capacitor will change due to mutual coupling between the source, or active, capacitor and the passive object. Normally, change of the capacitance is relatively small due to very weak fields around the capacitor outside the space between the two conducting plates.

FIG. 7 shows a system 700 having a passive capacitor 701 of negative capacitance that is near a source capacitor 702. There is a sub-capacitor of a pair of conducting patches 703 and 704 at the source capacitor 702 that are connected to the passive capacitor 701 by electric field lines. In this case, the sub-capacitor of 703 and 704 is connected to the passive capacitor 701 of negative capacitance in series. The total capacitance Cs of the pair of the sub-capacitor and the passive negative-capacitance capacitor can be obtained from 1/C=1/C1+1/C2 where C1 is the capacitance of the sub-capacitor of 703 and 704 and C2 is the capacitance of the passive capacitor 701. Since the sub-capacitor is split into two after introduction of the passive capacitor, 1/C1=1/C1*u*+1/C1*d* where C1*u* is the capacitor of the sub-capacitor above the passive capacitor and C1*d* is that below. Normally C1 is very small, which gives a small value of Cs regardless of the value of C2. However when C2 is negative, the situation changes drastically. In fact, making C2 equal to C1 in magnitude but negative, the effective capacitance becomes very large, essentially producing a conduction channel of current along the electric field lines that connect those two capacitors. The capacitance of the source capacitor 702 is significantly altered with the presence of the passive capacitor 701. Especially when the resonance occurs with C2 close to −C1, the total capacitance of the source capacitor 902 is almost equal to Cs, which is very large. At this point, a substantial amount of current flows from the RF source 710 to the sub-capacitor of 703 and 704 and then to the passive capacitor 701.

In order to collect power wirelessly from the active capacitor, the load resistance RL 711 is connected to the passive capacitor in series as shown in FIG. 7. Also in the figure is shown a capacitor of variable capacitance 712 in series for fine tuning. In the design process, the magnitude of the negative capacitance is preferably made slightly smaller than the sub-capacitor capacitance C1 so that resonance is obtained by adjusting the capacitance of the added capacitor Ca 712. At resonance, the current through the resistor is Vs/RL where Vs is the voltage across the active source capacitor. When a resonance occurs, then the impedance of the resultant active (source) device is determined mainly by that of the pair of the sub-capacitor and the passive charging system that are connected by electric field lines.

All inductors may be replaced with more compact and efficient capacitors having negative capacitance as described herein, such devices including wireless-charging devices as described in patent application Ser. No. 13/476,850, filed May 21, 2012, now U.S. Pat. No. 9,030,053, issued May 12, 2015, and patent application Ser. No. 14/210,740 filed Mar. 14, 2014, both of which patent applications and patent are incorporated by reference herein in their entireties, and are included as Appendices A and B to U.S. Provisional Application No. 62/144,914, filed Apr. 8, 2015, the benefit of which is being claimed herein.

Energy Harvesting

It is well known that there is substantial electromagnetic power in our environment, especially at the low-frequency spectrum. There are various sources of such power at low frequencies, such as lightning and other natural events. In most cases, it is difficult to collect such power because of improper impedance matching to a power collection device. Thus as soon as a reasonable load resistance RL is connected, the driver voltage of the device vanishes. However with this new capacitor of negative capacitance, it is now realizable that the very large reactance (magnitude) of the device can be maintained while the load resistor of small resistance is connected to draw the power from such environment.

Charger Orientation and Shape:

In order to have efficient reception, the charger is preferably oriented to maximize coupling with the sub-capacitor that is connected to the wireless charger by electric field lines. For example, for a two-parallel-plate capacitor, the electric field before placement of the charger is preferred to have its direction perpendicular to the plate surfaces as closely as possible. Also, a larger charger size in the direction perpendicular to the electric field will increase coupling between the source and charger capacitors.

Still further, the charger shape can influence C1, the capacitance between the source capacitor and charger. An enlarged shape of the charger in the direction of the electric field line will increase C1. In most cases, C1 is very small and its increased value will be helpful in designing an efficient charger.

Preferably, any values of C1 can be accommodated by introducing C2 that is close to −C1 to have a resonant condition.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A capacitor comprising:
   a first plate;
   a second plate substantially parallel to the first plate;
   an RF feed source having a first line and a second line through which RF is fed, the first line being electrically connected to the first plate, wherein the second line at least once:
      passes through the first and second plates, and
      loops around the first and second plates, and
   wherein the second line passes through the first plate and the second plate, and then goes around the second plate, travels to the inside of a cavity within the capacitor without going through the first plate, turns to make a current source perpendicular to the first plate, comes out of the second plate and repeats the last three steps to form loops where one vertical side is in the cavity and the other vertical side is outside of the cavity, and is then connected to the second plate.

2. The capacitor as recited in claim 1, wherein a separation distance between the first and second plates varies within the capacitor.

3. A wireless charger system comprising:
   an active capacitor that is connected to an AC power source; and
   a passive capacitor of negative capacitance coupled to the active capacitor electromagnetically, wherein the passive capacitor comprises:
   a first plate;
   a second plate substantially parallel to the first plate;
   an RF feed source having a first line and a second line through which RF is fed, the first line being electrically connected to the first plate, wherein the second line at least once:
      passes through the first and second plates, and
      loops around the first and second plates, and
   wherein the second line passes through the first plate and connects to the second plate; and
   wherein the first and second lines of the passive capacitor are connected with a load resistor to collect power.

4. The wireless charger system as recited in claim 3, wherein the passive capacitor is oriented such that the electric field lines of the active capacitor without the passive capacitor are substantially perpendicular to the surfaces of the passive capacitor.

5. The wireless charger system as recited in claim 3, wherein the passive capacitor has a negative capacitance of substantially the same magnitude as that of the active capacitor.

6. The wireless charger system as recited in claim 3, wherein the magnitude of the negative capacitance of the passive capacitor is less than that of the active capacitor, and wherein the first and second lines of the passive capacitor are connected with a load resistor and a variable capacitor that is used for fine tuning.

7. The wireless charger system as recited in claim 3, wherein the active capacitor is a resonating cavity.

8. The wireless charger system as recited in claim 3, wherein the active capacitor is any active RF source.

9. A capacitor comprising:
a first plate;
a second plate substantially parallel to the first plate, and spaced apart by a separation distance from the first plate;
a dielectric material interposed between the first plate and the second plate;
an RF feed source having a first line and a second line through which RF is fed, the first line being electrically connected to the first plate, wherein the second line at least once:
 passes through the first and second plates, and
 loops around the first and second plates, and
wherein the second line passes through the first plate and the second plate, then goes around the second plate, travels to the inside of a cavity within the capacitor without going through the first plate, turns to make a current source perpendicular to the first plate, comes out of the second plate and repeats the last three steps to form loops where one vertical side is in the cavity and the other vertical side is outside of the cavity, and is then connected to the second plate.

10. The capacitor as recited in claim 9, wherein the separation distance between the first and second plates varies within the capacitor.

* * * * *